United States Patent
Yang

(10) Patent No.: US 9,667,950 B2
(45) Date of Patent: May 30, 2017

(54) IMAGE PROJECTING SYSTEM AND SYNCHRONIZATION METHOD THEREOF

(75) Inventor: Chung-Yi Yang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 544 days.

(21) Appl. No.: 13/572,456

(22) Filed: Aug. 10, 2012

(65) Prior Publication Data
US 2013/0307944 A1 Nov. 21, 2013

(30) Foreign Application Priority Data
May 17, 2012 (TW) .............................. 101117493 A

(51) Int. Cl.
- *H04N 13/04* (2006.01)
- *H04N 13/00* (2006.01)
- *G03B 35/16* (2006.01)
- *H04N 13/02* (2006.01)

(52) U.S. Cl.
CPC ..... *H04N 13/0425* (2013.01); *H04N 13/0434* (2013.01); *H04N 13/0438* (2013.01); *H04N 13/0459* (2013.01); *H04N 13/0497* (2013.01); *G03B 35/16* (2013.01); *H04N 2213/008* (2013.01)

(58) Field of Classification Search
CPC ........... H04N 13/0239; H04N 13/0497; H04N 13/0438; H04N 13/0486; H04N 13/0459; H04N 9/3197; G02B 27/2214; H04B 1/713
USPC ...... 348/42, 51, 54, 55, 56, E13.053; 353/7, 353/121; 375/135
See application file for complete search history.

(56) References Cited

U.S. PATENT DOCUMENTS

| | | | |
|---|---|---|---|
| 4,567,513 A * | 1/1986 | Imsand | 348/55 |
| 6,088,052 A * | 7/2000 | Guralnick | 348/51 |
| 7,345,709 B2 * | 3/2008 | Chang et al. | 348/558 |
| 8,189,038 B2 * | 5/2012 | DeCusatis et al. | 348/58 |
| 8,223,162 B2 * | 7/2012 | Miyasaka et al. | 345/581 |

(Continued)

FOREIGN PATENT DOCUMENTS

| | | | |
|---|---|---|---|
| CN | 102348122 A * | 2/2012 | |
| CN | 102404605 A * | 4/2012 | |

(Continued)

*Primary Examiner* — Christopher S Kelley
*Assistant Examiner* — Kathleen Walsh
(74) *Attorney, Agent, or Firm* — Hauptman Ham, LLP

(57) ABSTRACT

An image projecting system and a synchronization method for use in the image projecting system are provided. The image projecting system comprises a projector, a pair of stereoscopic glasses and a light meter. The projector projects a left-right eye test image according to a timing, and generates a plurality of left-right eye synchronization signals according to the timing. The light meter, electrically connected to the projector, measures a plurality of left-lens brightness values and a plurality of right-lens brightness values through a left lens and a right lens of the pair of stereoscopic glasses, respectively. The projector calculates a plurality of left-lens light leakage values and a plurality of right-lens light leakage values corresponding to the left-right eye synchronization signals according to the left-lens brightness values and the right-lens brightness values, respectively, so as to choose one of the left-right eye synchronization signals as an adjusted left-right eye synchronization signal.

16 Claims, 12 Drawing Sheets

(56) References Cited

U.S. PATENT DOCUMENTS

| | | | |
|---|---|---|---|
| 8,699,542 B2* | 4/2014 | Mori et al. | 375/135 |
| 8,922,724 B2* | 12/2014 | Ueki et al. | 349/13 |
| 2005/0030426 A1* | 2/2005 | Chang et al. | 348/558 |
| 2007/0085902 A1* | 4/2007 | Walker | H04N 13/0497 348/51 |
| 2007/0121028 A1 | 5/2007 | Mihajlovic | |
| 2007/0229951 A1* | 10/2007 | Jung et al. | 359/465 |
| 2009/0051759 A1* | 2/2009 | Adkins et al. | 348/53 |
| 2009/0109282 A1* | 4/2009 | Schnebly et al. | 348/55 |
| 2010/0033555 A1* | 2/2010 | Nagase et al. | 348/43 |
| 2010/0066820 A1* | 3/2010 | Park et al. | 348/53 |
| 2010/0156964 A1* | 6/2010 | Masuda | G09G 3/342 345/691 |
| 2010/0253678 A1* | 10/2010 | Choi et al. | 345/419 |
| 2010/0259603 A1* | 10/2010 | Mihara et al. | 348/53 |
| 2010/0289883 A1* | 11/2010 | Goris | G09G 3/003 348/56 |
| 2010/0315316 A1* | 12/2010 | Mihara | H04N 13/0497 345/32 |
| 2010/0328611 A1* | 12/2010 | Silverstein et al. | 353/7 |
| 2011/0058024 A1* | 3/2011 | Choi et al. | 348/51 |
| 2011/0074937 A1* | 3/2011 | Nakahata | H04N 13/00 348/56 |
| 2011/0090320 A1* | 4/2011 | Tsuchida | 348/51 |
| 2011/0090324 A1* | 4/2011 | Mentz | H04N 13/0438 348/55 |
| 2011/0122238 A1* | 5/2011 | Hulvey et al. | 348/56 |
| 2011/0134231 A1* | 6/2011 | Hulvey et al. | 348/56 |
| 2011/0157165 A1* | 6/2011 | Jung et al. | 345/419 |
| 2011/0157335 A1* | 6/2011 | Yoo et al. | 348/56 |
| 2011/0164123 A1* | 7/2011 | Park et al. | 348/56 |
| 2011/0187840 A1* | 8/2011 | Chao et al. | 348/53 |
| 2011/0205346 A1* | 8/2011 | Taniguchi | 348/56 |
| 2011/0249103 A1* | 10/2011 | Taniguchi | 348/56 |
| 2011/0279451 A1 | 11/2011 | Haga | |
| 2011/0285832 A1* | 11/2011 | Yoon et al. | 348/56 |
| 2011/0298902 A1* | 12/2011 | Kim et al. | 348/51 |
| 2012/0019639 A1* | 1/2012 | Chang et al. | 348/56 |
| 2012/0044332 A1* | 2/2012 | Ishida | 348/56 |
| 2012/0044333 A1* | 2/2012 | Kang | 348/56 |
| 2012/0050266 A1* | 3/2012 | MacNaughton et al. | 345/419 |
| 2012/0050498 A1* | 3/2012 | Jung | G09G 3/003 348/51 |
| 2012/0050856 A1 | 3/2012 | Shintani | |
| 2012/0069160 A1* | 3/2012 | Ko | H04N 13/0429 348/54 |
| 2012/0069164 A1* | 3/2012 | Nakagawa et al. | 348/56 |
| 2012/0081527 A1* | 4/2012 | Richardson et al. | 348/56 |
| 2012/0105608 A1* | 5/2012 | Ko | 348/54 |
| 2012/0127288 A1* | 5/2012 | Cheng et al. | 348/56 |
| 2012/0154550 A1* | 6/2012 | Takagi et al. | 348/49 |
| 2012/0154555 A1* | 6/2012 | Iwanaka | G09G 3/003 348/51 |
| 2012/0162400 A1* | 6/2012 | Iwanaka | G02B 27/2264 348/54 |
| 2012/0169853 A1* | 7/2012 | Shin | 348/56 |
| 2012/0176373 A1* | 7/2012 | Haga et al. | 345/419 |
| 2012/0188339 A1* | 7/2012 | Tanaka | H04N 13/0438 348/43 |
| 2012/0194657 A1* | 8/2012 | Ko | 348/56 |
| 2012/0249523 A1* | 10/2012 | Choi et al. | 345/419 |
| 2012/0320030 A1* | 12/2012 | Origuchi et al. | 345/214 |
| 2013/0021325 A1* | 1/2013 | Kim et al. | 345/419 |
| 2013/0027526 A1* | 1/2013 | Mao | 348/56 |
| 2013/0235052 A1* | 9/2013 | Seo | H04N 13/0438 345/520 |

FOREIGN PATENT DOCUMENTS

| | | | |
|---|---|---|---|
| EP | 2387247 A2 * | 11/2011 | |
| EP | 2421277 A1 * | 2/2012 | |
| JP | WO 2012014462 A1 * | 2/2012 | H04N 13/0438 |
| JP | 2012083657 A * | 4/2012 | |
| WO | WO 2010141514 A2 * | 12/2010 | |
| WO | WO 2011014692 A1 * | 2/2011 | |
| WO | WO 2011019398 | 2/2011 | |
| WO | WO 2011125400 A1 * | 10/2011 | |
| WO | WO 2012005036 A1 * | 1/2012 | |

\* cited by examiner

IMAGE PROJECTING SYSTEM AND SYNCHRONIZATION METHOD THEREOF

This application claims priority based on Taiwan Patent Application No. 101117493 filed on May 17, 2012, which is hereby incorporated by reference in its entirety.

CROSS-REFERENCES TO RELATED APPLICATIONS

Not applicable.

BACKGROUND OF THE INVENTION

Field of the Invention

The present invention provides an image projecting system and a synchronization method thereof. More particularly, the image projecting system of the present invention mitigates crosstalk in sight between the left eye and the right eye by calculating light leakage values of a left lens and a right lens of a pair of stereoscopic glasses corresponding to a plurality of synchronization signals and choosing one of the synchronization signals as an adjusted synchronization signal according to the light leakage values of the left lens and the right lens.

Descriptions of the Related Art

As stereoscopic image projection technologies have gradually become more sophisticated, related applications have become widespread in enterprises and homes to allow the public to enjoy high-quality audio & video (AV) programs. For the projection of a stereoscopic image, a synchronization signal must be used to control the light transmitting through a left lens and a right lens of a pair of stereoscopic glasses. In particular, when a projector is projecting a stereoscopic image, the projector transmits the synchronization signal simultaneously to a pair of active stereoscopic glasses or a polarizer so that a left-eye image and a right-eye image that are projected can be received by the left eye and the right eye of the user respectively.

For a stereoscopic image projecting system, a dark time (DT) is usually incorporated in each left-eye image and each right eye image to coordinate with the response time (RT) necessary for the pair of active stereoscopic glasses or the polarizer when switching between a transmissive status and a blocking status so as to mitigate crosstalk in sight between the left eye and the right eye. Generally, clock phases of the synchronization signal must match with a timing in which the projector projects the left-eye image and the right-eye image of the stereoscopic image so that the crosstalk in sight between the left eye and the right eye can be mitigated through the use of dark time. However, in practical operations, a delay may occur due to signal transmissions and processing, or the dark time set in the projector may be not the same as the RT of the pair of active stereoscopic glasses or the polarizer. This may cause the clock phases of the synchronization signal received by the pair of active stereoscopic glasses or the polarizer to become mismatched with the timings at which the left-eye image and the right-eye image are displayed on the screen. In such a situation, it is difficult to effectively mitigate the crosstalk in sight between the left eye and the right eye through the use of dark time.

Accordingly, an urgent need exists in the art to solve the problem that it is difficult to effectively mitigate the crosstalk in sight between the left eye and the right eye through the use of dark time because of mismatch between the clock phases of the received synchronization signal and the timings at which the left-eye image and the right-eye image are displayed on the screen.

SUMMARY OF THE INVENTION

An objective of the present invention is to provide an image projecting system and a synchronization method thereof. The image projecting system of the present invention projects a left-right eye test image and utilizes a plurality of left-right eye synchronization signals and a plurality of brightness values measured from a pair of stereoscopic glasses to choose one of the left-right eye synchronization signals that matches the best with the left-right eye test image as an adjusted left-right eye synchronization signal. In this way, the present invention can solve the problem that it is difficult to effectively mitigate crosstalk in sight between the left eye and the right eye that occurs because of the mismatch between the clock phases of the received synchronization signal and the timing in which the left-eye image and the right-eye image are displayed on the screen.

To achieve the aforesaid objective, the present invention discloses an image projecting system, which comprises a projector, a pair of active stereoscopic glasses and a light meter. The projector is configured to project a left-right eye test image according to a timing, and to generate a plurality of left-right eye synchronization signals according to the timing. The pair of active stereoscopic glasses comprises a left lens and a right lens and receives the left-right eye synchronization signals from the projector. The light meter is electrically connected to the projector, and is configured to measure a plurality of left-lens brightness values and a plurality of right-lens brightness values through the left lens and the right lens, respectively, and to transmit the left-lens brightness values and the right-lens brightness values to the projector. The projector further calculates a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to transmit the adjusted left-right eye synchronization signal to the pair of active stereoscopic glasses so that the pair of active stereoscopic glasses operates according to the adjusted left-right eye synchronization signal.

To achieve the aforesaid objective, the present invention further discloses a synchronization method for use in an image projecting system. The image projecting system comprises a projector, a pair of active stereoscopic glasses and a light meter. The pair of active stereoscopic glasses comprises a left lens and a right lens. The light meter is electrically connected to the projector. The synchronization method comprises the following steps:

(a) enabling the projector to project a left-right eye test image according to a timing and to generate a plurality of left-right eye synchronization signals according to the timing;

(b) enabling the pair of active stereoscopic glasses to receive the left-right eye synchronization signals from the projector;

(c) enabling the light meter to measure a plurality of left-lens brightness values and a plurality of right-lens brightness values through the left lens and the right lens, respectively, and to transmit the left-lens brightness values and the right-lens brightness values to the projector; and (d) enabling the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values, and to transmit the adjusted left-right eye synchronization signal to the pair of active stereoscopic glasses so that the pair of active stereoscopic glasses operates according to the adjusted left-right eye synchronization signal.

To achieve the aforesaid objective, the present invention discloses an image projecting system, which comprises a projector, a pair of passive stereoscopic glasses and a light meter. The projector comprises a polarizer, and is configured to project a left-right eye test image according to a timing and to generate a plurality of left-right eye synchronization signals for controlling the polarizer according to the timing. The pair of passive stereoscopic glasses comprises a left lens and a right lens. The light meter is electrically connected to the projector, and is configured to measure a plurality of left-lens brightness values and a plurality of right-lens brightness values through the left lens and the right lens, respectively, and to transmit the left-lens brightness values and the right-lens brightness values to the projector. The projector further calculates a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to control the polarizer by using the adjusted left-right eye synchronization signal.

To achieve the aforesaid objective, the present invention further discloses a synchronization method for use in an image projecting system. The image projecting system comprises a projector, a pair of passive stereoscopic glasses and a light meter. The projector comprises a polarizer. The pair of passive stereoscopic glasses comprises a left lens and a right lens. The light meter is electrically connected to the projector. The synchronization method comprises the following steps:

(a) enabling the projector to project a left-right eye test image according to a timing and to generate a plurality of left-right eye synchronization signals for controlling the polarizer according to the timing;

(b) enabling the light meter to measure a plurality of left-lens brightness values and a plurality of right-lens brightness values through the left lens and the right lens of the pair of passive stereoscopic glasses, respectively, and to transmit the left-lens brightness values and the right-lens brightness values to the projector; and (c) enabling the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to control the polarizer by using the adjusted left-right eye synchronization signal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, the description of these embodiments is only for the purpose of illustration rather than to limit the present invention. It should be appreciated that in the following embodiments and the attached drawings, elements unrelated to the present invention are omitted from depiction; and the dimensional relationships among individual elements in the attached drawings are illustrated only for ease of understanding, but not to limit the actual scale.

Figure 1:
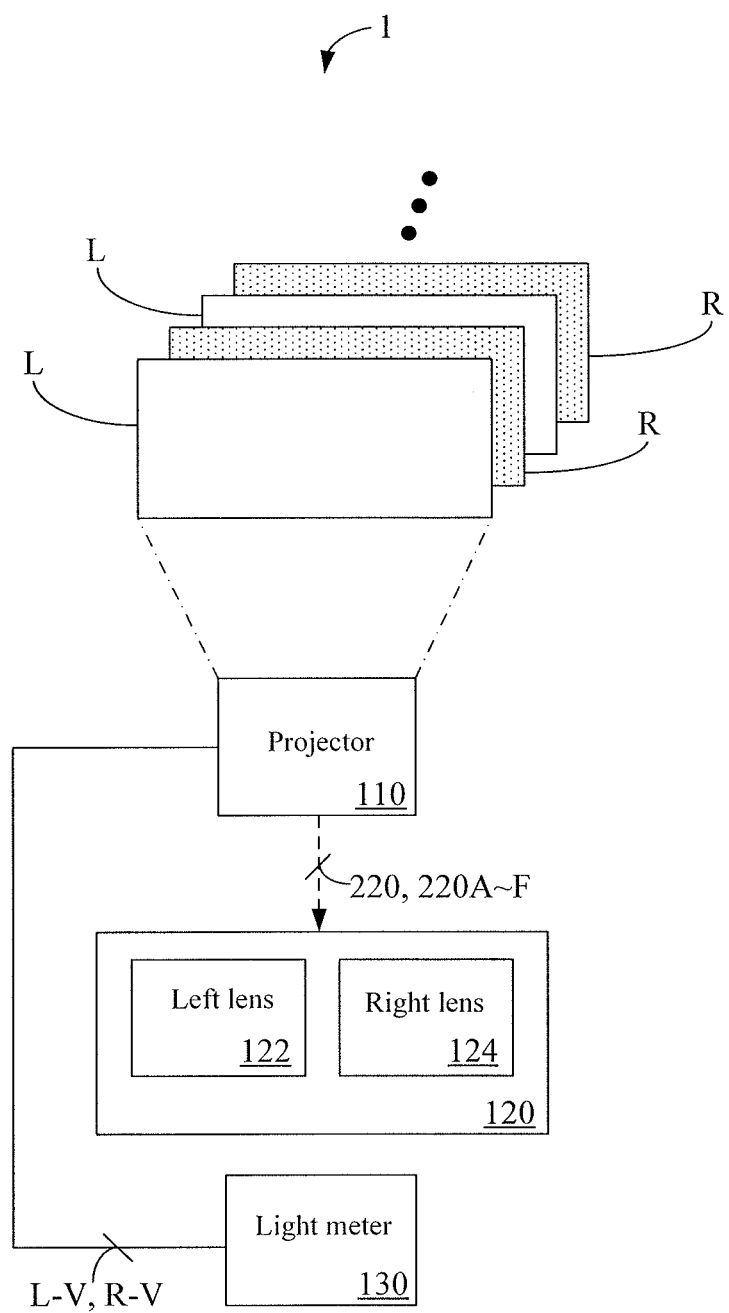
FIG. 1 is a schematic view of an image projecting system according to a first embodiment of the present invention.
Figure 2A:
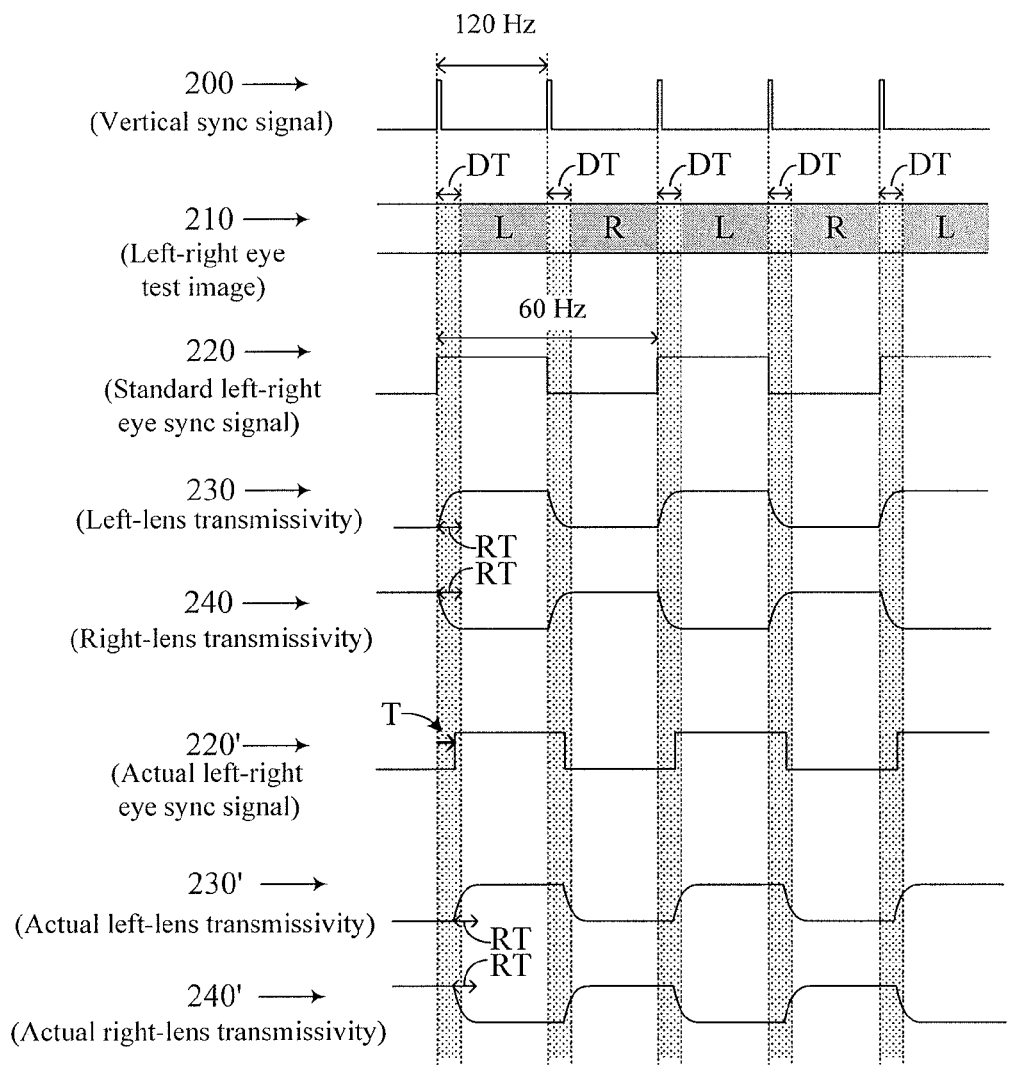
FIG. 2A is a schematic view illustrating variations of test images, a left-right eye synchronization signal, left-lens transmissivity and right-lens transmissivity versus time in the image projecting system.
Figure 2B:
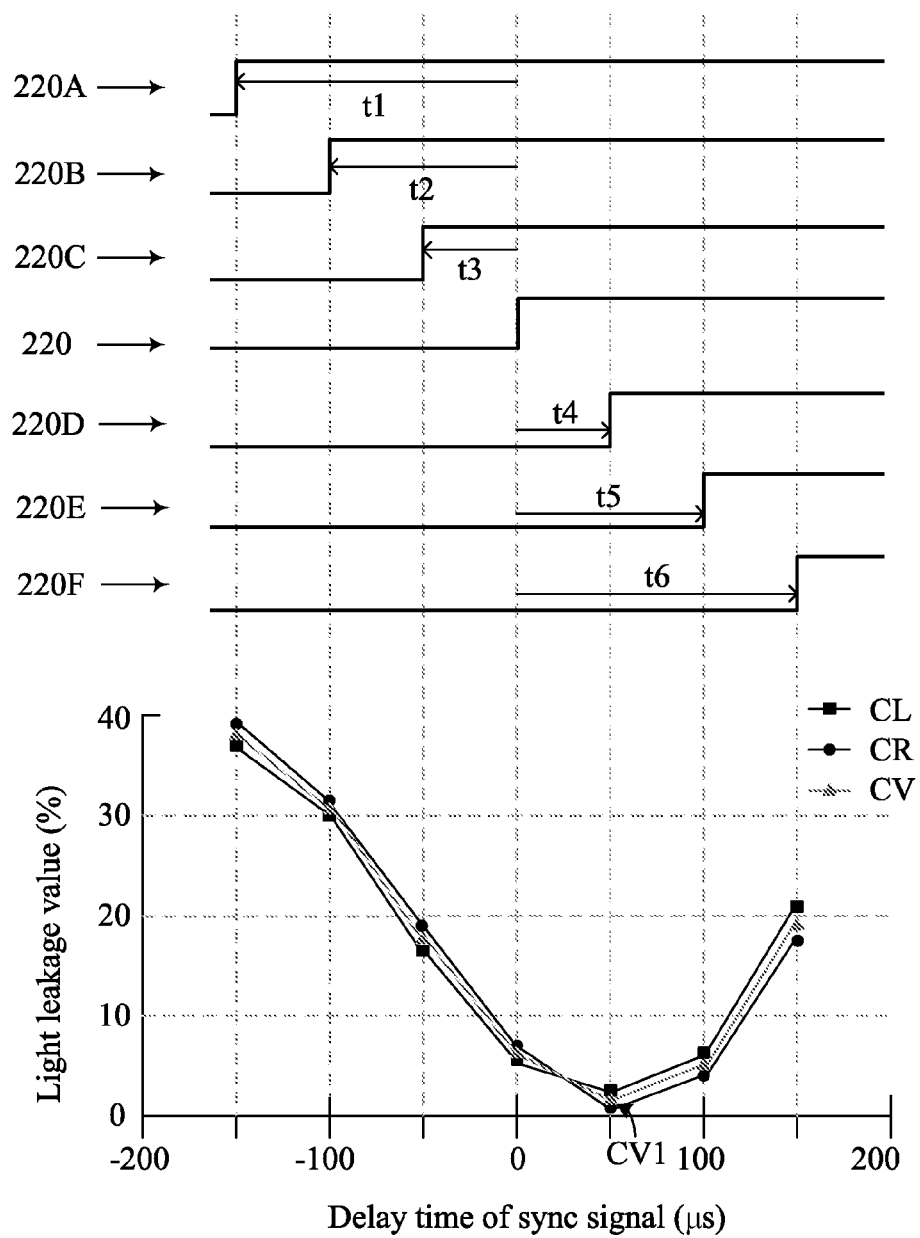
FIG. 2B is a schematic view illustrating left-right eye synchronization signals and corresponding light leakage values.
Figure 2C:
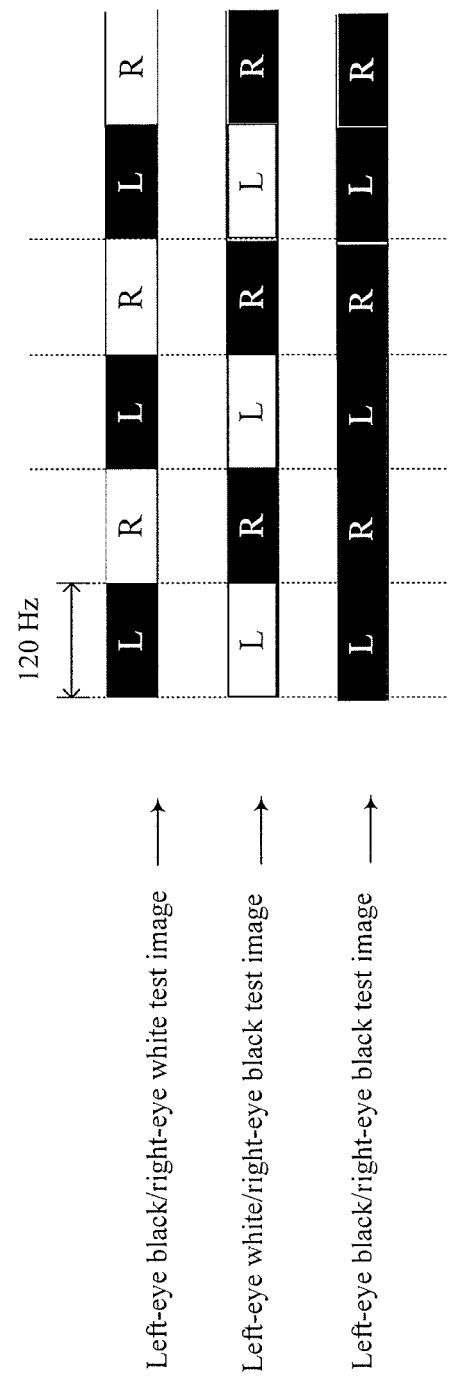
FIG. 2C is a schematic view illustrating left-right eye test images.

A first embodiment of the present invention is shown in FIGS. 1, 2A, 2B, and 2C. FIG. 1 is a schematic view of an image projecting system 1. FIG. 2A is a schematic view illustrating variations of a left-right eye test image, a left-right eye synchronization signal, left-lens transmissivity and right-lens transmissivity versus time in the image projecting system. FIG. 2B is a schematic view illustrating left-right eye synchronization signals and corresponding light leakage values. FIG. 2C is a schematic view illustrating left-right eye test images.

The image projecting system 1 comprises a projector 110, a pair of active stereoscopic glasses 120 and a light meter 130. The projector 110 is a stereoscopic image projector, and projects a left-right eye test image 210 according to a timing. Herein, "L" represents a left-eye test image to be received by a left eye, and "R" represents a right-eye test image to be received by the right eye. In this embodiment, a unit of the timing is 1/120 second; that is, the left-eye test image L and the right-eye test image R in the left-right eye test image 210 projected by the projector 110 appear alternately at a frequency of 120 Hz. While the left-right eye test image 210 is being projected, the projector 110 further generates a standard left-right eye synchronization signal 220 according to the timing. The standard left-right eye synchronization signal 220 has a frequency of 60 Hz.

The pair of active stereoscopic glasses 120 may be a pair of active liquid crystal stereoscopic glasses comprising a left lens 122 and a right lens 124. In operation, the pair of active stereoscopic glasses 120 is wirelessly connected with the projector 110, and receives a standard left-right eye synchronization signal 220 from the projector 110. It shall be appreciated that the standard left-right eye synchronization signal 220 means a left-right eye synchronization signal that has not been particularly adjusted, and in other embodiments, the pair of active stereoscopic glasses 120 may be connected with the projector 110 via a wire.

The pair of active stereoscopic glasses 120 operates the left lens 122 and the right lens 124 according to the standard left-right eye synchronization signal 220. As shown in FIG. 2A, when the standard left-right eye synchronization signal 220 is at a high level, the left lens 122 exhibits a light transmissive status (i.e., the left-lens transmissivity 230 is at a high level) while the right-lens 124 exhibits a blocking status (i.e., the right-lens transmissivity 240 is at a low level); in this case, the left-eye test image L can be received through the left lens 122 but cannot be received through the right lens 124. On the other hand, when the standard left-right eye synchronization signal 220 is at a low level, the left lens 122 exhibits a blocking status (i.e., the left-lens transmissivity 230 is at a low level) while the right-lens 124 exhibits a light transmissive status (i.e., the right-lens transmissivity 240 is at a high level); in this case, the right-eye test image R can be received through the right lens 124 but cannot be received through the left lens 122.

As described previously in the "Descriptions of the Related Art", the response time (RT) necessary for the pair of active stereoscopic glasses to switch between the transmissive status and the blocking status is about 2~3 milliseconds ($10^{-3}$ second; ms), so the projector 10 must add a dark time (DT) before each image to mitigate the crosstalk in sight between the left eye and the right eye. However, in fact, the delay caused by signal transmissions and processing will give rise to a delay time T of the synchronization signal 220 received by the pair of active stereoscopic glasses (i.e., as shown by the left-right eye synchronization signal 220' in FIG. 2). Therefore, the clock phases of the left-right eye synchronization signal 220' that is actually received will be mismatched with the timing at which the left-eye image and the right-eye image of the stereoscopic image are displayed on the screen. Thus, it becomes difficult for the dark time DT to completely coincide with the response time RT of the left lens 122 and the right lens 124 (i.e., as shown by the actual left-lens transmissivity 230' and the actual right-lens transmissivity 240'), thus, leading to the crosstalk in sight between the left eye and the right eye.

To solve this problem, the projector 110 of the present invention will adjust the synchronization signal 220. With reference to FIG. 2B, the standard left-right eye synchronization signal 220 and a plurality of left-right eye synchronization signals 220A, 220B, 220C, 220D, 220E, 220F are generated by the projector 110 according to a timing. Each of the left-right eye synchronization signals 220A, 220B, 220C, 220D, 220E, 220F is generated by changing the phase of the standard left-right eye synchronization signal 220; i.e., the left-right eye synchronization signals 220A, 220B, 220C, 220D, 220E, 220F are generated by delaying the standard left-right eye synchronization signal 220 by times t1, t2, t3, t4, t5 and t6 respectively. In this embodiment, t1, t2, t3, t4, t5 and t6 are −150 microseconds (μs), −100 μs, −50 μs, 50 μs, 100 μs and 150 μs respectively.

Then, the projector 110 transmits the left-right eye synchronization signals 220A, 220B, 220C, 220D, 220E, 220F and the standard left-right eye synchronization signal 220 to the pair of active stereoscopic glasses 120 respectively. Meanwhile, the projector 110 projects the left-right eye test image 210 according to a timing. The pair of active stereoscopic glasses 120 operates the left lens 122 and the right lens 124 according to each of the left-right eye synchronization signals 220A, 220B, 220C, 220D, 220E, 220F and the standard left-right eye synchronization signal 220.

When the pair of active stereoscopic glasses 120 operates the left lens 122 and the right lens 124 according to each of the left-right eye synchronization signals 220A, 220B, 220C, 220D, 220E, 220F and the standard left-right eye synchronization signal 220, the light meter 130 connected to the projector 110 measures left-lens brightness values L-V and right-lens brightness values R-V through the left lens 122 and the right lens 124 respectively. In other words, the light meter 130 measures the brightness values of the left-right eye test image 210 through the left lens 122 and the right lens 124 corresponding to different left-right eye synchronization signals. Thereafter, the light meter 130 transmits the left-lens brightness values L-V and the right-lens brightness values R-V to the projector 110. The projector 110 calculates a plurality of left-lens light leakage values CL of the left lens 122 corresponding to the left-right eye synchronization signals 220A, 220B, 220C, 220D, 220E, 220F and the standard left-right eye synchronization signal 220 according to the left-lens brightness values L-V, and calculates a plurality of right-lens light leakage values CR of the right lens 124 corresponding to the left-right eye synchronization signals 220A, 220B, 220C, 220D, 220E, 220F and the standard left-right eye synchronization signal 220 according to the right-lens brightness values R-V.

Specifically, the left-right eye test image 210 comprises a left-eye black/right-eye white test image, a left-eye white/right-eye black test image and a left-eye black/right-eye black test image, as shown in FIG. 2C. For each of the left-right eye synchronization signals 220A, 220B, 220C, 220D, 220E, 220F and the standard left-right eye synchronization signal 220, the light meter 130 measures a left-eye white/right-eye black test image brightness value $YL_{LWRB}$, a left-eye black/right-eye white test image brightness value $YL_{LBRW}$ and a left-eye black/right-eye black test image brightness value $YL_{LBRB}$ through the left lens 122 respectively. The left-lens light leakage values CL are calculated according to the following formula:

$$CL = (YL_{LBRW} - YL_{LBRB})/(YL_{LWRB} - YL_{LBRB}).$$

Similarly, for each of the left-right eye synchronization signals 220A, 220B, 220C, 220D, 220E, 220F and the standard left-right eye synchronization signal 220, the light meter 130 measures a left-eye white/right-eye black test image brightness value $YR_{LWRB}$, a left-eye black/right-eye white test image brightness value $YR_{LBRW}$ and a left-eye black/right-eye black test image brightness value $YR_{LBRB}$ through the right lens 124 respectively. The right-lens light leakage values CR are calculated according to the following formula:

$$CR=(YR_{LWRB}-YR_{LBRB})/(YR_{LBRW}-YR_{LBRB}).$$

Next, the projector 110 chooses one of the left-right eye synchronization signals 220A, 220B, 220C, 220D, 220E, 220F and the standard left-right eye synchronization signal 220 as an adjusted left-right eye synchronization signal according to the left-lens light leakage values CL and the right-lens light leakage values CR. In detail, the projector 110 can choose the left-right eye synchronization signal 220D corresponding to the lowest left-lens light leakage value CL and the lowest right-lens light leakage value CR, and transmit the left-right eye synchronization signal 220D to the pair of active stereoscopic glasses 120. Then, the pair of active stereoscopic glasses 120 operates the left lens 122 and the right lens 124 according to the left-right eye synchronization signal 220D so that the dark time (DT) can surely coincide with the response time (RT) necessary for the pair of active stereoscopic glasses 120 to switch between the transmissive status and the blocking status so as to mitigate the crosstalk in sight between the left eye and the right eye.

Please refer to FIG. 2B. Furthermore, in this embodiment, the projector 110 determines a lowest light leakage average value CV1 from a plurality of light leakage average values CV of the left-lens light leakage values CL and the right-lens light leakage values CR corresponding to the left-right eye synchronization signals 220A, 220B, 220C, 220D, 220E, 220F and the standard left-right eye synchronization signal 220, and chooses the left-right eye synchronization signal 220D corresponding to the lowest light leakage average value CV1 as the adjusted left-right eye synchronization signal.

Figure 3:
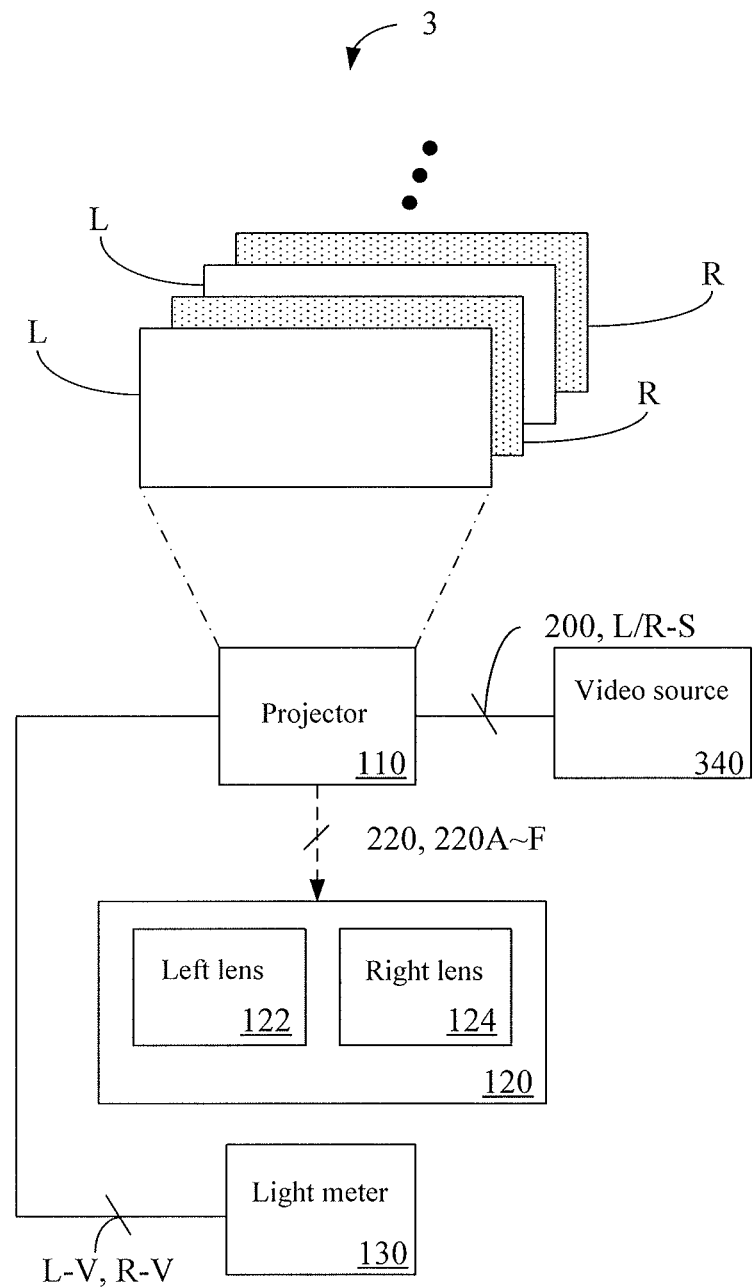
FIG. 3 is a schematic view of an image projecting system according to a second embodiment of the present invention.

A second embodiment of the present invention is shown in FIG. 3, which is a schematic view of an image projecting system 3. Unlike the first embodiment, the image projecting system 3 further comprises a video source 340. The video source 340 is electrically connected to the projector 110 and is configured to generate a vertical synchronization signal 200, as shown in FIG. 2A. The projector 110 determines the timing according to the vertical synchronization signal 200. The video source 340 further generates and transmits a left-right eye test signal L/R-S to the projector 110. The projector 110 projects the left-right eye test image 210 according to the left-right eye test signal L/R-S.

In detail, in the first embodiment, the projector 110 projects the left-right eye test image 210 according to data and a timing that are preset in itself, and generates the standard left-right eye synchronization signal 220 and the left-right eye synchronization signals 220A, 220B, 220C, 220D, 220E, 220F according to the timing. However, in the second embodiment, the projector 110 determines a timing according to the vertical synchronization signal 200 generated by the video source 340, generates the standard left-right eye synchronization signal 220 and the left-right eye synchronization signals 220A, 220B, 220C, 220D, 220E, 220F according to the determined timing, and projects the left-right eye test image 210 according to the left-right eye test signal L/R-S generated by the video source 340 and the determined timing.

Figure 4:
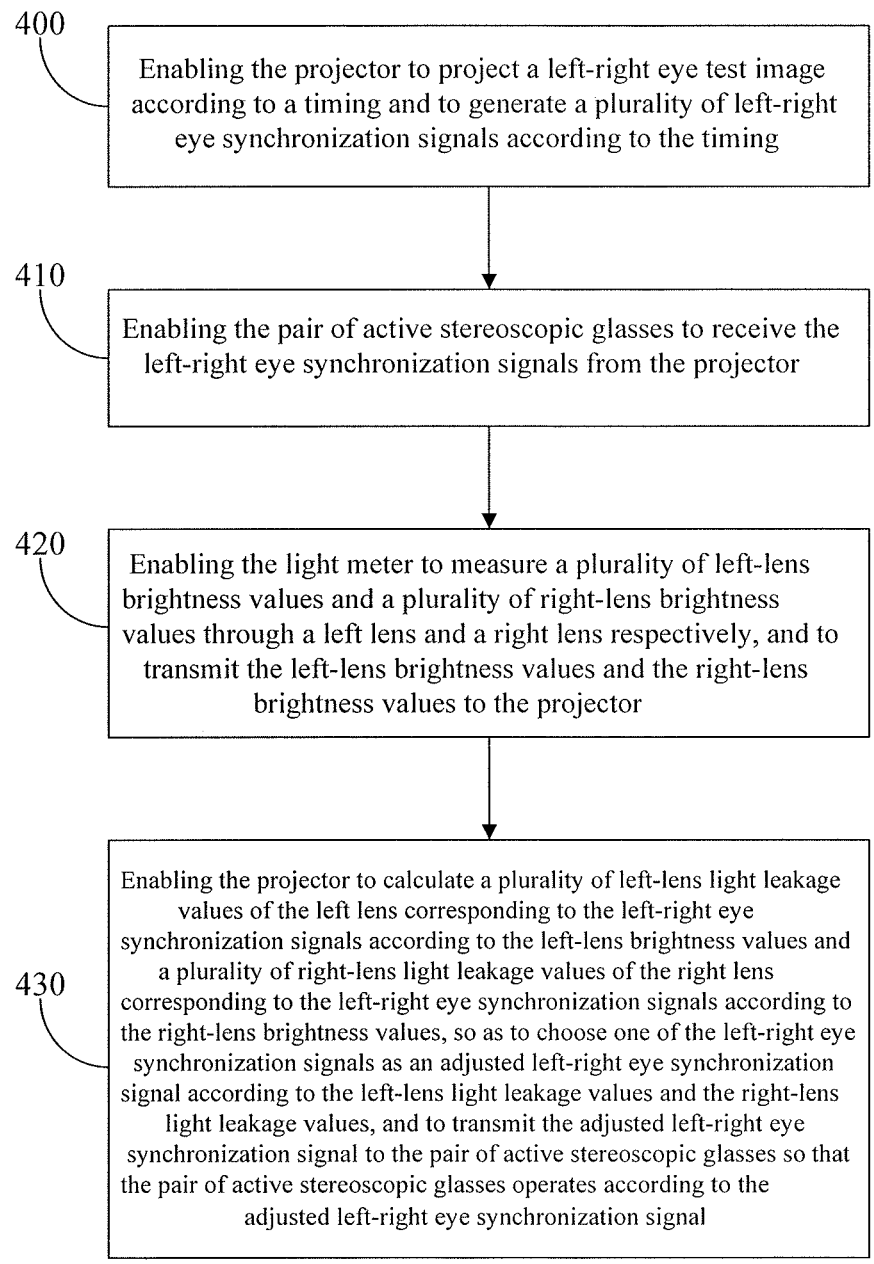
FIG. 4 is a flowchart diagram of a synchronization method according to a third embodiment of the present invention.

A third embodiment of the present invention is shown in FIG. 4, which is a flowchart diagram of a synchronization method. The synchronization method of the third embodiment is for use in an image projecting system, for example, the image projecting system 1 of the first embodiment. The image projecting system comprises a projector, a pair of active stereoscopic glasses and a light meter. The projector is wirelessly connected to the pair of active stereoscopic glasses and electrically connected to the light meter. The pair of active stereoscopic glasses comprises a left lens and a right lens.

First, step 400 is executed to enable the projector to project a left-right eye test image according to a timing and to generate a plurality of left-right eye synchronization signals according to the timing. Then, step 410 is executed to enable the pair of active stereoscopic glasses to receive the left-right eye synchronization signals from the projector. Next, step 420 is executed to enable the light meter to measure a plurality of left-lens brightness values and a plurality of right-lens brightness values through the left lens and the right lens respectively, and to transmit the left-lens brightness values and the right-lens brightness values to the projector.

Finally, step 430 is executed to enable the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values, and to transmit the adjusted left-right eye synchronization signal to the pair of active stereoscopic glasses so that the pair of active stereoscopic glasses operates according to the adjusted left-right eye synchronization signal.

In addition to the aforesaid steps, the synchronization method of the third embodiment can also execute all the operations and functions set forth in the first embodiment and the second embodiment. The method in which the third embodiment executes these operations and functions will be readily appreciated by those of ordinary skill in the art based on the explanation of the first embodiment and the second embodiment, and thus, will not be further described herein.

Figure 5:
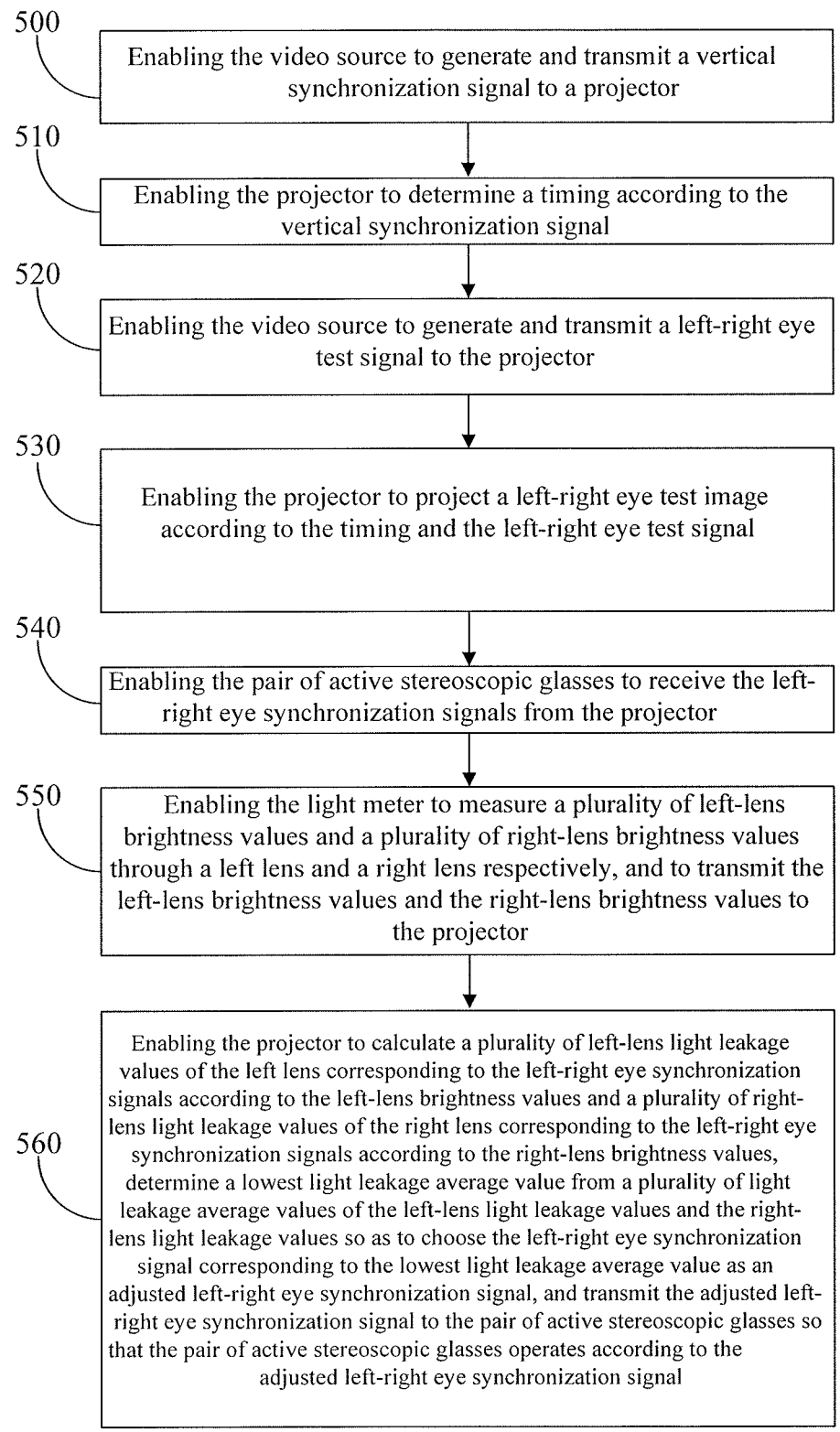
FIG. 5 is a flowchart diagram of a synchronization method according to a fourth embodiment of the present invention.

A fourth embodiment of the present invention is shown in FIG. 5, which is a flowchart diagram of a synchronization method. The synchronization method of the fourth embodiment is for use in an image projecting system, for example, the image projecting system 3 of the second embodiment. The image projecting system comprises a projector, a pair of active stereoscopic glasses, a light meter and a video source. The projector is wirelessly connected to the pair of active stereoscopic glasses. The projector is electrically connected to the light meter and the video source respectively. The pair of active stereoscopic glasses comprises a left lens and a right lens.

First, step 500 is executed to enable the video source to generate and transmit a vertical synchronization signal to the projector. Then, step 510 is executed to enable the projector to determine a timing according to the vertical synchronization signal. Next, step 520 is executed to enable the video source further to generate and transmit a left-right eye test signal to the projector. Thereafter, step 530 is executed to enable the projector to project a left-right eye test image according to the timing and the left-right eye test signal.

Next, step 540 is executed to enable the pair of active stereoscopic glasses to receive the left-right eye synchronization signals from the projector. Then, step 550 is executed to enable the light meter to measure a plurality of left-lens brightness values and a plurality of right-lens brightness values through the left lens and the right lens respectively, and to transmit the left-lens brightness values and the right-lens brightness values to the projector. Finally, step 560 is executed to enable the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, determine a lowest light leakage average value from a plurality of light leakage average values of the left-lens light leakage values and the right-lens light leakage values so as to choose the left-right eye synchronization signal corresponding to the lowest light leakage average value as an adjusted left-right eye synchronization signal, and transmit the adjusted left-right eye synchronization signal to the pair of active stereoscopic glasses so that the pair of active stereoscopic glasses operates according to the adjusted left-right eye synchronization signal.

In addition to the aforesaid steps, the synchronization method of the fourth embodiment can also execute all the operations and functions set forth in the first embodiment and the second embodiment. The method in which the fourth embodiment executes these operations and functions will be readily appreciated by those of ordinary skill in the art based on the explanation of the first embodiment and the second embodiment, and thus, will not be further described herein.

Figure 6:
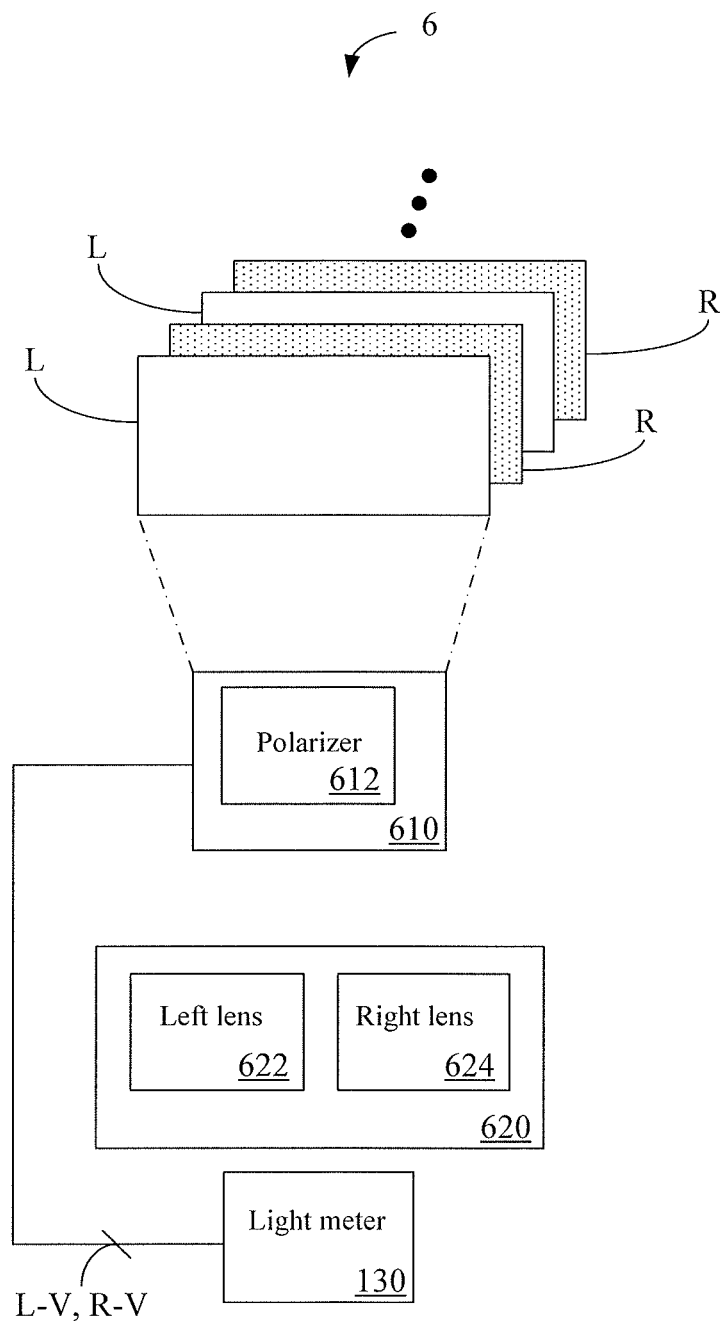
FIG. 6 is a schematic view of an image projecting system according to a fifth embodiment of the present invention.

A fifth embodiment of the present invention is shown in FIG. 6, which is a schematic view of an image projecting system 6. In this embodiment, the image projecting system 6 comprises a projector 610, a pair of passive stereoscopic glasses 620 and a light meter 130. The projector 610 is electrically connected to the light meter 130. The projector 610 comprises a polarizer 612. The pair of passive stereoscopic glasses 620 comprises a left lens 622 and a right lens 624.

Figure 7:
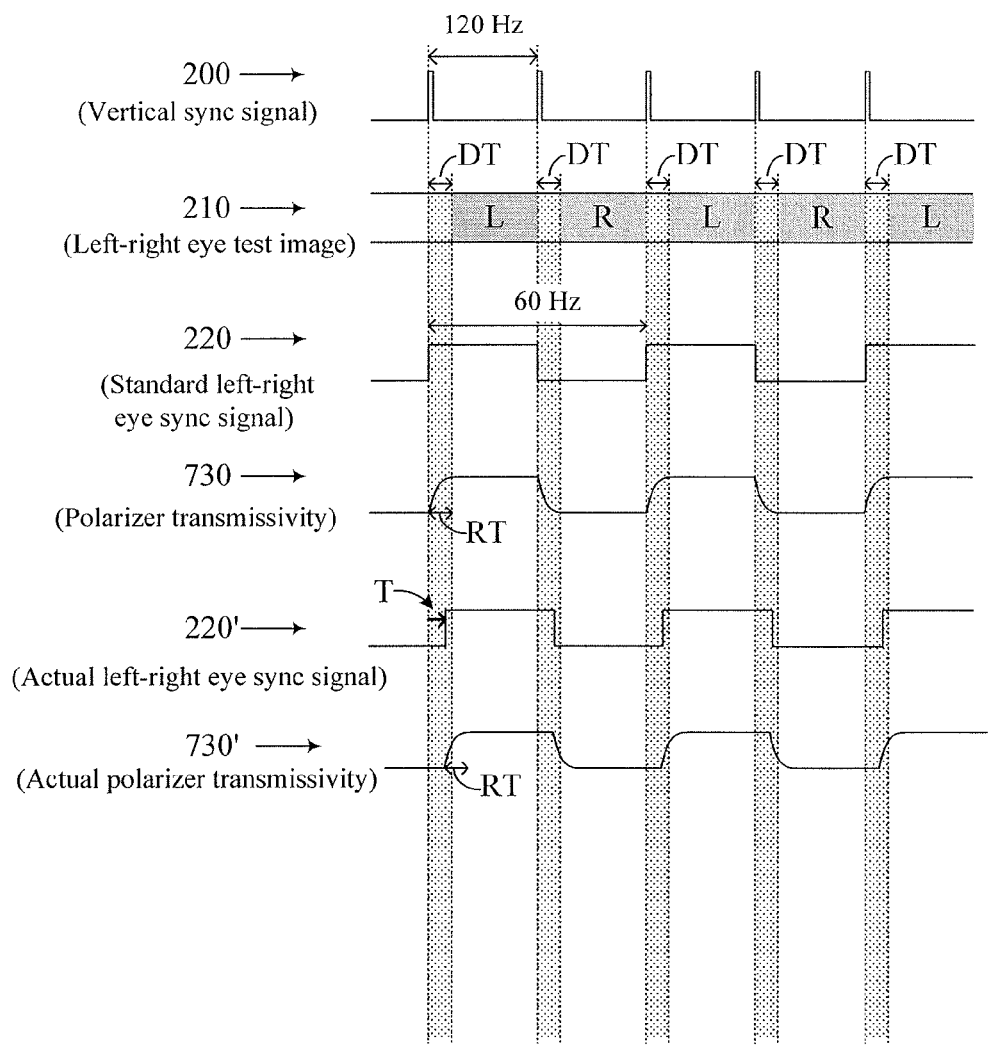
FIG. 7 is a schematic view illustrating variations of test images, a left-right eye synchronization signal, and polarizer transmissivity versus time in the image projecting system.

Unlike the first embodiment, the pair of stereoscopic glasses of the image projecting system 6 in this embodiment is of the passive type and the projector 610 comprises the polarizer 612. Specifically in this embodiment, the stereoscopic displaying effect is achieved in the following way: the polarizer 612 switches between different polarization directions according to the left-right eye synchronization signals provided by the projector 610 so as to polarize the projection image vertically and horizontally, in which the left lens 622 receives only the vertically polarized image and the right lens 624 receives only the horizontally polarized image. As shown in FIG. 7, when the transmissivity 730 of the polarizer is at a high level, the projection image is vertically polarized by the polarizer 612 so that the projection image will only have the vertically polarized component after passing through the polarizer 612. In this case, the left lens 622 receives the vertically polarized image through the polarizer 612, and the right lens 624 blocks the vertically polarized image to produce a blocking effect. Similarly, when the transmissivity 730 of the polarizer is at a low level, the projection image is horizontally polarized by the polarizer 612, so the projection image will only have the horizontally polarized component after passing through the polarizer 612. In this case, the right lens 624 receives the horizontally polarized image through the polarizer 612, and the left lens 622 blocks the horizontally polarized image to produce a blocking effect. Because a response time (RT) is also necessary for the polarizer 612 to switch between different polarization directions, the projector 10 also must incorporate a dark time (DT) before each image to mitigate the crosstalk in sight between the left eye and the right eye. Likewise, in fact, the delay caused by the signal transmissions and processing will give rise to a delay time T of the left-right eye synchronization signal received by the polarizer 612 (i.e., as shown by the left-right eye synchronization signal 220' in FIG. 2). Therefore, the clock phases of the left-right eye synchronization signal 220' that is actually received will be mismatched with the timings in which the left-eye image and the right-eye image of the stereoscopic image are displayed on the screen. In this case, it becomes difficult for the dark time DT to completely coincide with the response time (RT) of the polarizer 612, thus, leading to the crosstalk in sight between the left eye and the right eye.

Similar to the first embodiment, the projector 610 of this embodiment projects the left-right eye test image 210 according to a timing, and transmits different left-right eye synchronization signals (i.e., the standard left-right eye synchronization signal 220 and the left-right eye synchronization signals 220A, 220B, 220C, 220D, 220E, 220F) to the polarizer 612. The light meter 630 measures a plurality of left-lens brightness values L-V and a plurality of right-lens brightness values R-V through the left lens 622 and the right lens 624 respectively. Then, the left-lens brightness values L-V and the right-lens brightness values R-V are transmitted to the projector 610. The projector 610 calculates a plurality of left-lens light leakage values CL of the left lens 622 corresponding to the left-right eye synchronization signals 220A, 220B, 220C, 220D, 220E, 220F and the standard left-right eye synchronization signal 220 according to the left-lens brightness values L-V, and calculates a plurality of right-lens light leakage values CR of the right lens 624 corresponding to the left-right eye synchronization signals 220A, 220B, 220C, 220D, 220E, 220F and the standard left-right eye synchronization signal 220 according to the right-lens brightness values R-V.

Finally, the projector 610 chooses one of the left-right eye synchronization signals 220A, 220B, 220C, 220D, 220E, 220F and the standard left-right eye synchronization signal 220 as an adjusted left-right eye synchronization signal according to the left-lens light leakage values CL and the right-lens light leakage values CR. Furthermore, the projector 610 determines a lowest light leakage average value CV1 from a plurality of light leakage average values CV of the left-lens light leakage values CL and the right-lens light leakage values CR corresponding to the left-right eye synchronization signals 220A, 220B, 220C, 220D, 220E, 220F and the standard left-right eye synchronization signal 220, and chooses the left-right eye synchronization signal 220D corresponding to the lowest light leakage average value CV1 as the adjusted left-right eye synchronization signal. Then, the adjusted left-right eye synchronization signal is used to control the polarizer 612 so that the polarizer 612 switches between the polarization directions according to the adjusted left-right eye synchronization signal.

Figure 8:
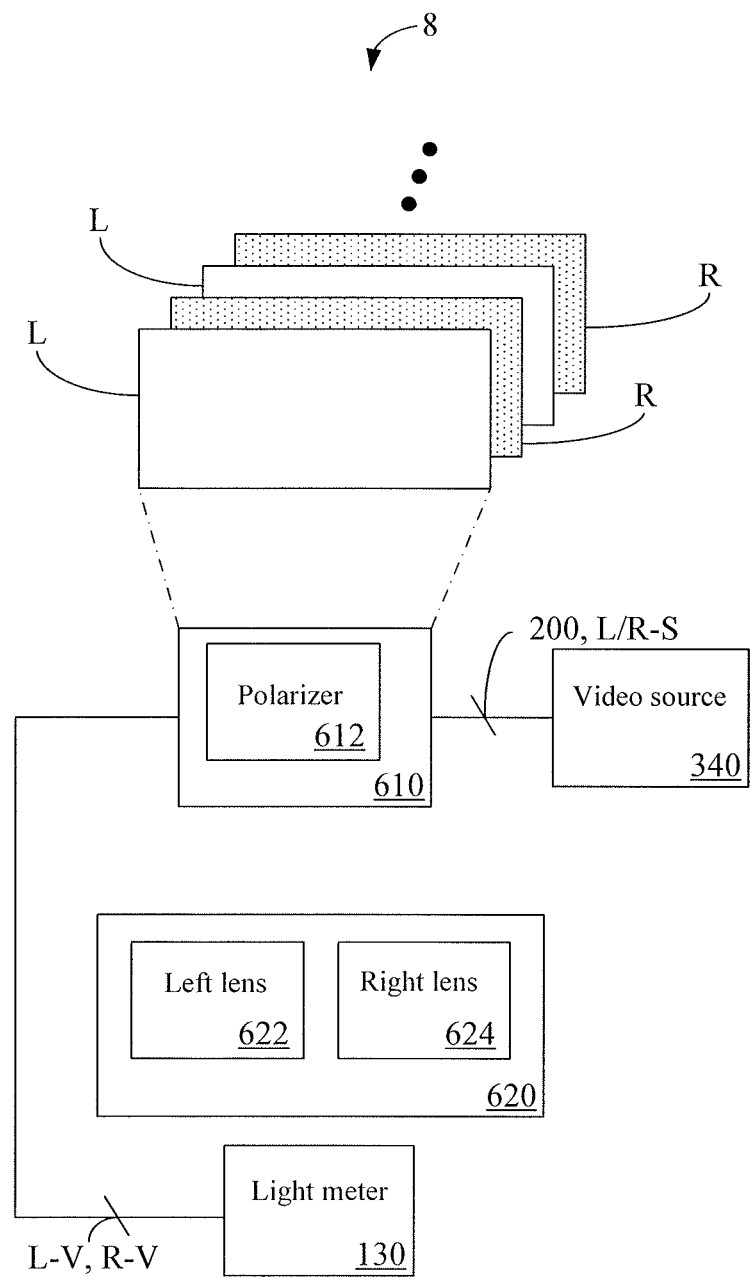
FIG. 8 is a schematic view of an image projecting system according to a sixth embodiment of the present invention.

A sixth embodiment of the present invention is shown in FIG. 8, which is a schematic view of an image projecting system 8. Unlike the fifth embodiment, the image projecting system 8 of this embodiment further comprises a video source 340 electrically connected to the projector 610.

Specifically, the video source 340 is electrically connected to the projector 610 and is configured to generate a vertical synchronization signal 200, as shown in FIG. 2A. The projector 610 determines the timing according to the vertical synchronization signal 200. The video source 340 further generates and transmits a left-right eye test signal L/R-S to the projector 610. The projector 610 projects the left-right eye test image 210 according to the left-right eye test signal L/R-S.

In detail, in the fifth embodiment, the projector 610 projects the left-right eye test image 210 according to data and a timing that are preset in itself, and generates the standard left-right eye synchronization signal 220 and the left-right eye synchronization signals 220A, 220B, 220C, 220D, 220E, 220F according to the timing. However, in the sixth embodiment, the projector 610 determines a timing according to the vertical synchronization signal 200 generated by the video source 340, generates the standard left-right eye synchronization signal 220 and the left-right eye synchronization signals 220A, 220B, 220C, 220D, 220E, 220F according to the determined timing, and projects the left-right eye test image 210 according to the left-right eye test signal L/R-S generated by the video source 340 and the determined timing.

Figure 9:
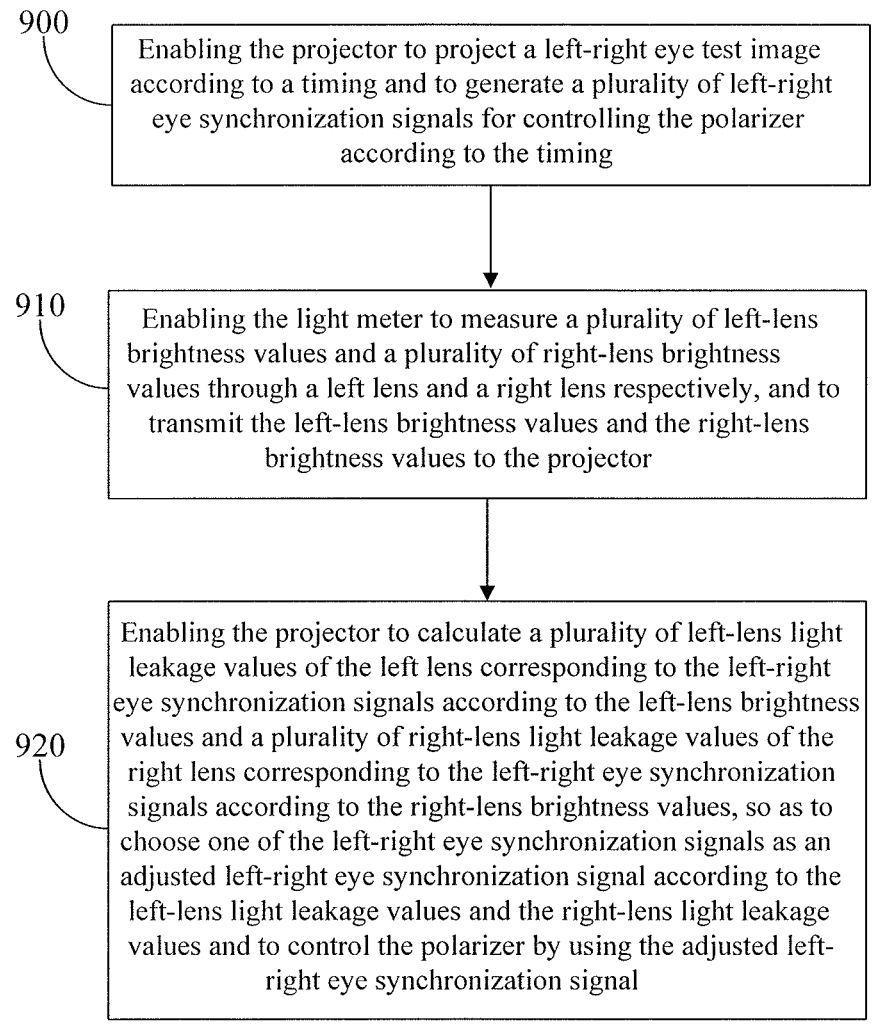
FIG. 9 is a flowchart diagram of a synchronization method according to a seventh embodiment of the present invention.

A seventh embodiment of the present invention is a synchronization method, a flowchart diagram of which is shown in FIG. 9. The synchronization method of this embodiment is for use in an image projecting system, for example, the image projecting system 6 of the fifth embodiment. The image projecting system comprises a projector, a pair of passive stereoscopic glasses and a light meter. The projector is electrically connected to the light meter. The projector comprises a polarizer. The pair of passive stereoscopic glasses comprises a left lens and a right lens.

Firstly, step 900 is executed to enable the projector to project a left-right eye test image according to a timing and to generate a plurality of left-right eye synchronization signals for controlling the polarizer according to the timing. Then, step 910 is executed to enable the light meter to measure a plurality of left-lens brightness values and a plurality of right-lens brightness values through the left lens and the right lens respectively, and to transmit the left-lens brightness values and the right-lens brightness values to the projector.

Next, step 920 is executed to enable the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to control the polarizer by using the adjusted left-right eye synchronization signal so that the polarizer switches between polarization directions according to the adjusted left-right eye synchronization signal.

In addition to the aforesaid steps, the synchronization method of the seventh embodiment can also execute all the operations and functions set forth in the fifth embodiment and the sixth embodiment. The method in which the seventh embodiment executes these operations and functions will be readily appreciated by those of ordinary skill in the art based on the explanation of the fifth embodiment and the sixth embodiment, and thus, will not be further described herein.

Figure 10:
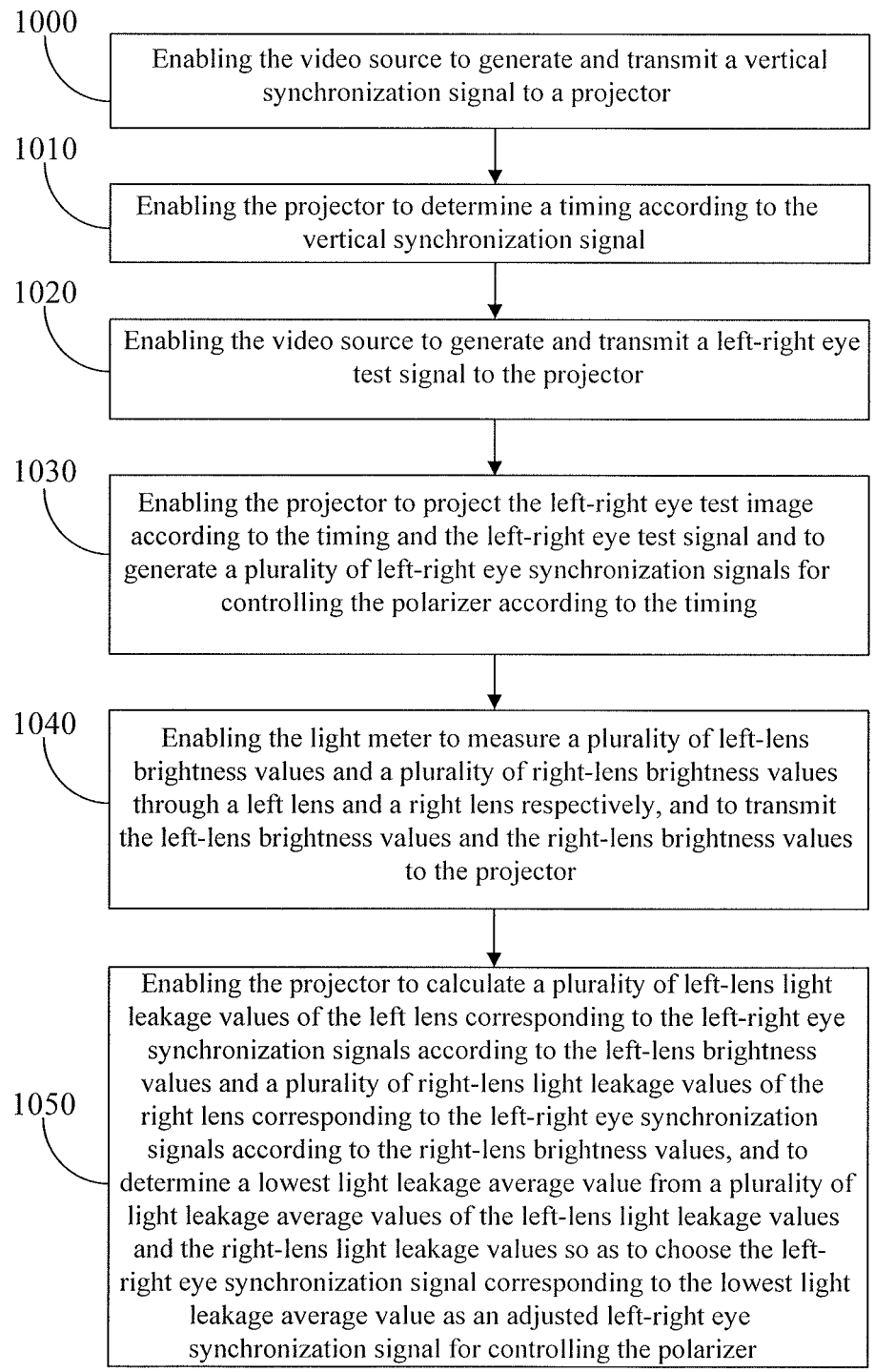
FIG. 10 is a flowchart diagram of a synchronization method according to a eighth embodiment of the present invention.

A eighth embodiment of the present invention is a synchronization method, a flowchart diagram of which is shown in FIG. 10. The synchronization method of the eighth embodiment is for use in an image projecting system, for example, the image projecting system 8 of the seventh embodiment. The image projecting system comprises a projector, a pair of passive stereoscopic glasses, a light meter and a video source. The projector is electrically connected to the light meter and the video source respectively. The projector comprises a polarizer. The pair of passive stereoscopic glasses comprises a left lens and a right lens.

First, step 1000 is executed to enable the video source to generate and transmit a vertical synchronization signal to the projector. Then, step 1010 is executed to enable the projector to determine a timing according to the vertical synchronization signal. Next, step 1020 is executed to enable the video source to generate and transmit a left-right eye test signal to the projector, and step 1030 is executed to enable the projector to project the left-right eye test image according to the timing and the left-right eye test signal and to generate a plurality of left-right eye synchronization signals for controlling the polarizer according to the timing. Herein, the polarizer switches between the polarization directions according to the left-right eye synchronization signals provided by the projector so as to vertically and horizontally polarize the projection image respectively.

Next, step 1040 is executed to enable the light meter to measure a plurality of left-lens brightness values and a plurality of right-lens brightness values through the left lens and the right lens respectively, and to transmit the left-lens brightness values and the right-lens brightness values to the projector. Finally, step 1050 is executed to enable the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, and to determine a lowest light leakage average value from a plurality of light leakage average values of the left-lens light leakage values and the right-lens light leakage values so as to choose one of the left-right eye synchronization signals that corresponds to the lowest light leakage average value as the adjusted left-right eye synchronization signal for controlling the polarizer. Thereby, the polarizer can switch between the polarization directions according to the adjusted left-right eye synchronization signal.

In addition to the aforesaid steps, the synchronization method of the eighth embodiment can also execute all the operations and functions set forth in the fifth embodiment and the sixth embodiment. The method in which the eighth embodiment executes these operations and functions will be readily appreciated by those of ordinary skill in the art based on the explanation of the fifth embodiment and the sixth embodiment, and thus, will not be further described herein.

According to the above descriptions, in the image projecting system and the synchronization method thereof of the present invention, the projector projects a left-right eye test image and generates a plurality of different left-right eye synchronization signals to the pair of active stereoscopic glasses or the polarizer. Meanwhile, the left-lens brightness values and the right-lens brightness values through the pair of stereoscopic glasses are measured by the light meter so that the projector can calculate left-lens light leakage values and right-lens light leakage values corresponding to the left-right eye synchronization signals according to the brightness values. Finally, one of the left-right eye synchronization signals that matches the best with the left-right eye test image is chosen as an adjusted left-right eye synchronization signal according to the light leakage average values of the left-lens light leakage values and the right-lens light leakage values. In this way, the present invention can solve the problem that it is difficult to effectively mitigate the crosstalk in sight between the left eye and the right eye through the use of dark time because of mismatch between the clock phases of the received synchronization signal and the timings at which the left-eye image and the right-eye image of the stereoscopic image are displayed on the screen.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image projecting system, comprising:
a projector, being configured to project a left-right eye test image according to a timing, to generate a plurality of different left-right eye synchronization signals with different phases only by delaying a standard left-right eye synchronization signal by a plurality of different time periods according to the timing, and to transmit the left-right eye synchronization signals with different phases in sequence according to the timing, wherein the left-right eye synchronization signals are substantially the same as the standard left-right eye synchronization signal, and only delayed by the different time periods;
a pair of active stereoscopic glasses, comprising a left lens and a right lens, and being configured to receive the left-right eye synchronization signals from the projector; and
a light meter, being electrically connected to the projector, and being configured to measure a plurality of left-lens brightness values and a plurality of right-lens brightness values through the left lens and the right lens, respectively, and to transmit the left-lens brightness values and the right-lens brightness values to the projector;
wherein the projector further calculates a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to transmit the adjusted left-right eye synchronization signal to the pair of active stereoscopic glasses so that the pair of active stereoscopic glasses operates according to the adjusted left-right eye synchronization signal.

2. The image projecting system as claimed in claim 1, wherein the projector determines a lowest light leakage average value from a plurality of light leakage average values of the left-lens light leakage values and the right-lens light leakage values so as to choose the left-right eye synchronization signal corresponding to the lowest light leakage average value as the adjusted left-right eye synchronization signal, and the light leakage average values correspond to the left-right eye synchronization signals.

3. The image projecting system as claimed in claim 1, further comprising a video source electrically connected to the projector, wherein the video source generates and transmits a vertical synchronization signal to the projector, and the projector determines the timing according to the vertical synchronization signal.

4. The image projecting system as claimed in claim 3, wherein the video source further generates and transmits a left-right eye test signal to the projector, and the projector projects the left-right eye test image according to the left-right eye test signal.

5. A synchronization method for use in an image projecting system, the image projecting system comprising a projector, a pair of active stereoscopic glasses and a light meter, the pair of active stereoscopic glasses comprising a left lens and a right lens, and the light meter being electrically connected to the projector, the synchronization method comprising the following steps:
(a) enabling the projector to project a left-right eye test image according to a timing, to generate a plurality of different left-right eye synchronization signals with different phases only by delaying a standard left-right eye synchronization signal by a plurality of different time periods according to the timing, and to transmit the left-right eye synchronization signals with different phases in sequence according to the timing, wherein the left-right eye synchronization signals are substantially the same as the standard left-right eye synchronization signal, and only delayed by the different time periods;
(b) enabling the pair of active stereoscopic glasses to receive the left-right eye synchronization signals from the projector;
(c) enabling the light meter to measure a plurality of left-lens brightness values and a plurality of right-lens brightness values through the left lens and the right lens, respectively, and to transmit the left-lens brightness values and the right-lens brightness values to the projector; and
(d) enabling the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values, and to transmit the adjusted left-right eye synchronization signal to the pair of active stereoscopic glasses so that the pair of active stereoscopic glasses operates according to the adjusted left-right eye synchronization signal.

6. The synchronization method as claimed in claim 5, wherein the step (d) further comprises the following step:
(d1) enabling the projector to determine a lowest light leakage average value from a plurality of light leakage average values of the left-lens light leakage values and the right-lens light leakage values so as to choose the left-right eye synchronization signal corresponding to the lowest light leakage average value as the adjusted left-right eye synchronization signal, wherein the light leakage average values correspond to the left-right eye synchronization signals.

7. The synchronization method as claimed in claim 5, wherein the image projecting system further comprises a video source electrically connected to the projector, and the step (a) further comprises the following steps:
   (a1) enabling the video source to generate and transmit a vertical synchronization signal to the projector; and
   (a2) enabling the projector to determine the timing according to the vertical synchronization signal.

8. The synchronization method as claimed in claim 7, wherein the step (a) further comprises the following steps:
   (a3) enabling the video source further to generate and transmit a left-right eye test signal to the projector; and
   (a4) enabling the projector to project the left-right eye test image according to the left-right eye test signal.

9. An image projecting system, comprising:
   a projector, comprising a polarizer, and being configured to project a left-right eye test image according to a timing, to generate a plurality of different left-right eye synchronization signals with different phases for controlling the polarizer only by delaying a standard left-right eye synchronization signal by a plurality of different time periods according to the timing, and to transmit the left-right eye synchronization signals with different phases in sequence according to the timing, wherein the left-right eye synchronization signals are substantially the same as the standard left-right eye synchronization signal, and only delayed by the different time periods;
   a pair of passive stereoscopic glasses, comprising a left lens and a right lens; and
   a light meter, being electrically connected to the projector, and being configured to measure a plurality of left-lens brightness values and a plurality of right-lens brightness values through the left lens and the right lens, respectively, and to transmit the left-lens brightness values and the right-lens brightness values to the projector;
   wherein, the projector further calculates a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to control the polarizer by using the adjusted left-right eye synchronization signal.

10. The image projecting system as claimed in claim 9, wherein the projector determines a lowest light leakage average value from a plurality of light leakage average values of the left-lens light leakage values and the right-lens light leakage values so as to choose the left-right eye synchronization signal corresponding to the lowest light leakage average value as the adjusted left-right eye synchronization signal, and the light leakage average values correspond to the left-right eye synchronization signals.

11. The image projecting system as claimed in claim 9, further comprising a video source electrically connected to the projector, wherein the video source generates and transmits a vertical synchronization signal to the projector, and the projector determines the timing according to the vertical synchronization signal.

12. The image projecting system as claimed in claim 11, wherein the video source further generates and transmits a left-right eye test signal to the projector, and the projector projects the left-right eye test image according to the left-right eye test signal.

13. A synchronization method for use in an image projecting system, the image projecting system comprising a projector, a pair of passive stereoscopic glasses and a light meter, the projector comprising a polarizer, the pair of passive stereoscopic glasses comprising a left lens and a right lens, and the light meter being electrically connected to the projector, the synchronization method comprising the following steps:
   (a) enabling the projector to project a left-right eye test image according to a timing, to generate a plurality of different left-right eye synchronization signals with different phases for controlling the polarizer only by delaying a standard left-right eye synchronization signal by a plurality of different time periods according to the timing, and to transmit the left-right eye synchronization signals with different phases in sequence according to the timing, wherein the left-right eye synchronization signals are substantially the same as the standard left-right eye synchronization signal, and only delayed by the different time periods;
   (b) enabling the light meter to measure a plurality of left-lens brightness values and a plurality of right-lens brightness values through the left lens and the right lens of the pair of passive stereoscopic glasses, respectively, and to transmit the left-lens brightness values and the right-lens brightness values to the projector; and
   (c) enabling the projector to calculate a plurality of left-lens light leakage values of the left lens corresponding to the left-right eye synchronization signals according to the left-lens brightness values and a plurality of right-lens light leakage values of the right lens corresponding to the left-right eye synchronization signals according to the right-lens brightness values, so as to choose one of the left-right eye synchronization signals as an adjusted left-right eye synchronization signal according to the left-lens light leakage values and the right-lens light leakage values and to control the polarizer by using the adjusted left-right eye synchronization signal.

14. The synchronization method as claimed in claim 13, wherein the step (c) further comprises the following step:
   (c1) enabling the projector to determine a lowest light leakage average value from a plurality of light leakage average values of the left-lens light leakage values and the right-lens light leakage values so as to choose the left-right eye synchronization signal corresponding to the lowest light leakage average value as the adjusted left-right eye synchronization signal, and the light leakage average values correspond to the left-right eye synchronization signals.

15. The synchronization method as claimed in claim 13, wherein the image projecting system further comprises a video source electrically connected to the projector, and the step (a) further comprises the following steps:
   (a1) enabling the video source to generate and transmit a vertical synchronization signal to the projector; and
   (a2) enabling the projector to determine the timing according to the vertical synchronization signal.

16. The synchronization method as claimed in claim 15, wherein the step (a) further comprises the following steps:
   (a3) enabling the video source further to generate and transmit a left-right eye test signal to the projector; and (a4) enabling the projector to project the left-right eye test image according to the left-right eye test signal.

* * * * *